United States Patent [19]

Cooke

[11] Patent Number: 4,578,870

[45] Date of Patent: Apr. 1, 1986

[54] SELECTIBLE BEAM/PLANE PROJECTING LASER AND ALIGNMENT SYSTEM

[75] Inventor: Claude R. Cooke, Auburn, Calif.

[73] Assignee: C R Laser Corporation, Auburn, Calif.

[21] Appl. No.: 701,691

[22] Filed: Feb. 14, 1985

[51] Int. Cl.$^4$ .............................................. G01B 11/27
[52] U.S. Cl. ................................. 33/288; 33/180 AT; 350/6.3; 356/155
[58] Field of Search ........... 33/288, 180 AT, 181 AT, 33/DIG. 21; 372/9, 14, 16, 101; 356/152, 155; 350/484, 168, 6.1, 6.3; 331/94.5 C

[56] References Cited

U.S. PATENT DOCUMENTS

| | | | |
|---|---|---|---|
| 3,680,000 | 7/1972 | Chesler et al. | 331/94.5 |
| 3,825,856 | 7/1974 | Pezot | 331/94.5 C |
| 3,905,705 | 9/1975 | Petrohilos | 350/6.3 |
| 4,130,362 | 12/1978 | Lill et al. | 33/288 |
| 4,154,531 | 5/1979 | Roberts, Jr. et al. | 356/155 |
| 4,163,200 | 7/1979 | DeMaggio | 331/94.5 C |
| 4,274,738 | 6/1981 | Hollandsworth et al. | 33/288 |
| 4,330,945 | 5/1982 | Eck | 33/288 |
| 4,442,608 | 4/1984 | Clausen | 33/288 |

OTHER PUBLICATIONS

Clausen Universal Measuring System, Autobody Repair Magazine, date unknown.
Laser I Gauging System, "Collision Repair Equipment", Chart Industries Ltd., Aug. 1982.
Photographs of Kar-Grabber Mfg. Co., Nov. 1983.

*Primary Examiner*—Willis Little
*Attorney, Agent, or Firm*—Litman, Day and McMahon

[57] ABSTRACT

A selectible beam/plane projecting laser is particularly useful for vehicle frame and body alignment. A lens contained in a holder mechanism mounted on a laser projector housing flips into and out of the laser beam path and when in the path, changes the beam to a plane. When used for vehicle frame and body alignment, the plane of the laser generated light allows the operator to spot targets any place in the plane of light and makes easier determination of alignment conditions.

7 Claims, 8 Drawing Figures

SELECTIBLE BEAM/PLANE PROJECTING LASER AND ALIGNMENT SYSTEM

FIELD OF THE INVENTION

This invention relates to laser generated beam projectors and in particular, to such a laser beam projector for use in vehicle frame and body alignment systems.

BACKGROUND OF THE INVENTION

The use of laser beams as alignment tools to check the proper relationship of frame parts and body panels in vehicles has become recently known. Such devices as the LAZER ALIGNER (TM) made by the Kansas Jack Division of Hein-Werner Corporation and described in Eck U.S. Pat. No. 4,330,945 employs a laser generated beam of light impinging upon targets spaced from the laser and positioned on the vehicle remotely from the laser projector. Because the vehicle is a three dimensional object, the laser and the targets may not be and indeed are likely not positioned in the same plane relative to the underside of the vehicle and the laser must sweep a plane, such as a vertical plane, to locate various objects therein. Because the typical laser heretofore projects only a narrow, pencil like beam of light, various rotatable mountings have been made for the laser projector. These mountings are often critical, for deviation in the spindles or bearings causes wandering or deviation of the beam of light as it sweeps upwardly and downwardly. Some such rotative structures are, by necessity, relatively precise and finely crafted and are therefore expensive in construction.

The present invention involves a mechanism which is relatively inexpensively constructed, can be mounted on the front end of the laser projector housing which selectively changes the emitted beam of light to a plane of light. Thus, the significantly more costly swivel or rotative mechanisms mounting the laser projector to various stands and tool bars may, in some intended uses, be omitted and the operator can more easily, by placing various targets in the plane of light, determine the position of the targets relative to the laser projector and therefore determine the correctness of the positions of the various body parts relative to each other, i.e. alignment.

The present invention generally includes a switching means which is mounted to the housing generally at the front wall of the housing and includes a holder member with a manually operated movable part which shifts from one position to another. In the first position of the movable part, the laser beam is substantially unaffected and continues to project out of the laser as a pencil beam of coherent, collimated light. In the second position of the shiftable member, the pencil beam of light passes through a lens which changes the orientation of the pencil beam to a plane.

The present invention is particularly useful with the system disclosed and claimed in the Kansas Jack Eck U.S. Pat. No. 4,330,945 and Kansas Jack has been licensed to use the present invention.

OBJECTS OF THE INVENTION

The principal objects of the present invention are: to provide a laser having a selectible beam/plane capability; to provide such a laser which ordinarily projects a beam of light and has a lens movable into the beam path to change the beam to a plane of light; to provide such a laser having a switching means mounted on its casing or housing; to provide such a laser adapted to a vehicle frame and body alignment system; to provide such a laser which in conjunction with the vehicle frame and body alignment system projects a plane or beam of light at targets spaced from the laser projector; and to provide such a selectible beam/plane laser which is relatively inexpensive, sturdy and efficient in use, and particularly well adapted for the intended purpose.

Other objects and advantages of this invention will become apparent from the following description taken in conjunction with the accompanying drawings wherein are set forth, by way of illustration and example, certain embodiments of this invention.

DESCRIPTION OF THE PREFERRED EMBODIMENT

Figure 1:
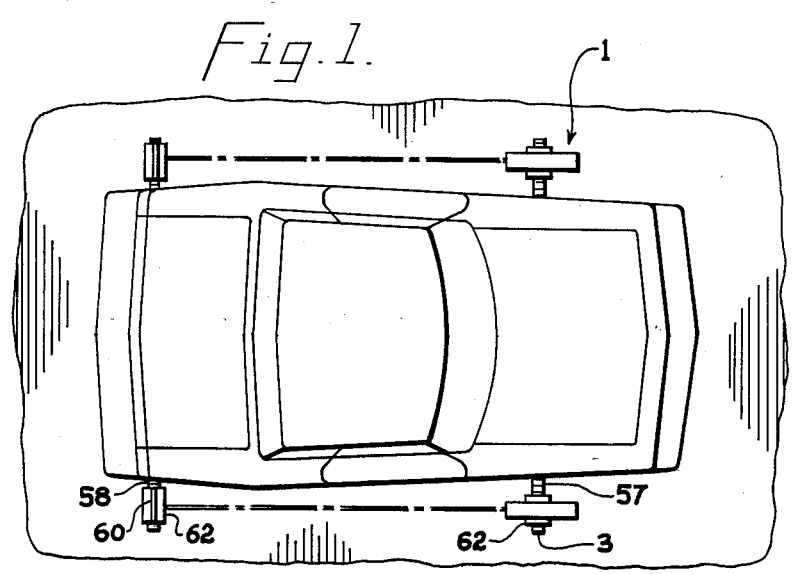
FIG. 1 is a top plan view of a vehicle frame and body alignment system using the selectible beam/plane projecting laser and mounted on a vehicle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
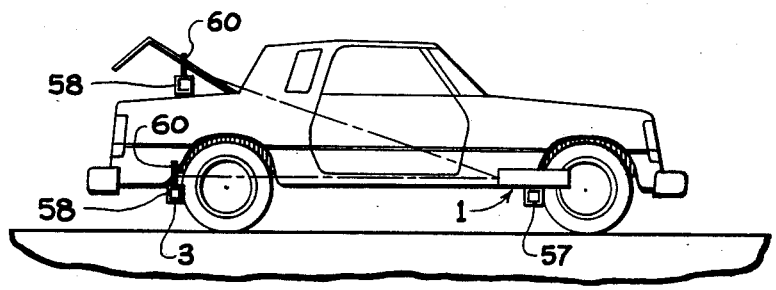
FIG. 2 is a side elevational view of a vehicle frame and body alignment system mounted upon a vehicle and employing a selectible beam/plane projector.

Referring to the drawings in more detail:

The reference numeral 1 generally indicates a selectible beam/plane projecting laser embodying the present invention and having a switching mechanism for changing the beam of light usually emitted by the laser 1 to a plane of light. The selectible beam/plane projecting laser 1 is preferably employed with a vehicle frame and body system 3, FIGS. 1 and 2, for sighting targets in a plane.

Figure 3:
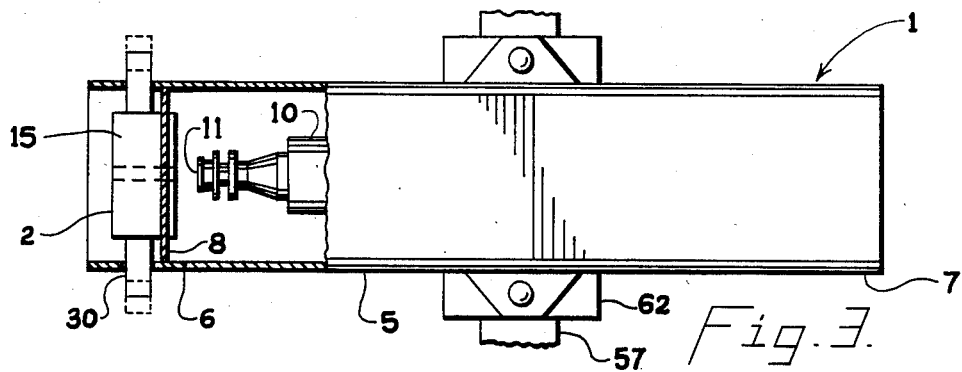
FIG. 3 is a fragmentary, top plan view of a selectible beam/plane projecting laser and showing interior details.
Figure 4:
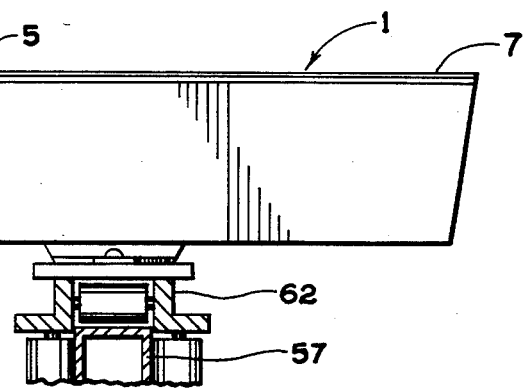
FIG. 4 is a fragmentary, side elevational view of the selectible beam/plane projecting laser.

In the illustrated embodiment, FIGS. 3 and 4, the selectible beam/plane projecting laser 1 includes an elongate housing 5 which is generally rectangular in shape and has front and rear ends 6 and 7 and a front wall 8. A laser beam projecting element 10, FIGS. 3 and 4, such as of a low power industrial grade for surveying and marking purposes is mounted, together with appropriate circuitry, in the housing 5 and has a beam emitting end 11 pointed toward the front wall 8.

The beam emitted by the laser projecting element 10 is a coherent, collimated cylindrical beam which, upon passing through the switching mechanism 2, is selectively changed to a coherent, collimated plane of light.

Figure 7:
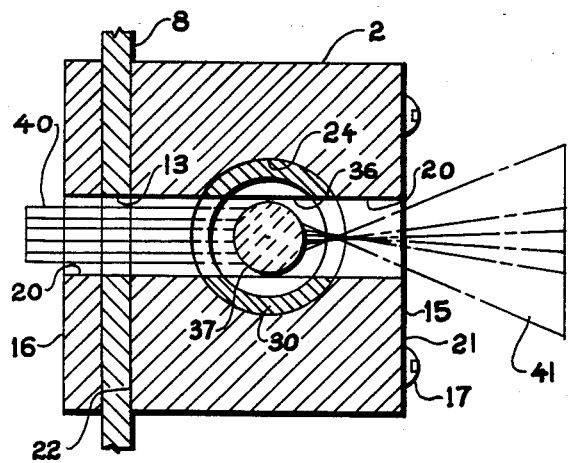
FIG. 7 is a cross-sectional view of the switching mechanism taken along line 7—7, FIG. 6.
Figure 8:
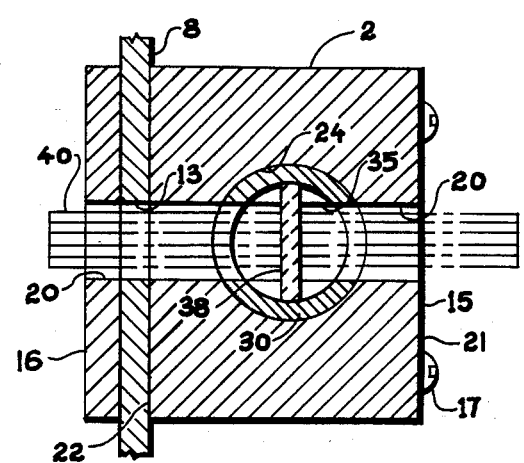
FIG. 8 is a cross-sectional view of the switching mechanism taken along line 8—8, FIG. 6.

In the illustrated example, the front wall 8 has an aperture 13 therethrough, FIGS. 4, 7 and 8. The switching mechanism 2 is mounted on the front wall 8 and includes internal elements aligned with the aperture 13 and with the beam directed from the beam emitting end 11. The exemplary switching mechanism 2 includes a holder member 15 which is essentially a rectangular block and which is connected to the front wall 8, with a backing plate 16 on the other side of the front wall 8, and connected to the front wall 8 and the backing plate 16 by screws 17 extending through screw holes 18. Both the holder member 15 and the backing plate 16 have through openings 20 placed in the middle of the holder member 15 and extending from a front side 21 to a rear side 22.

A bore 24 extends through the holder member 15 from the left side 25 to the right side 26 of the member 15. The bore 24 extends perpendicularly to the through opening 20 and the two coincide in approximately the middle of the holder member 15.

Figure 5:
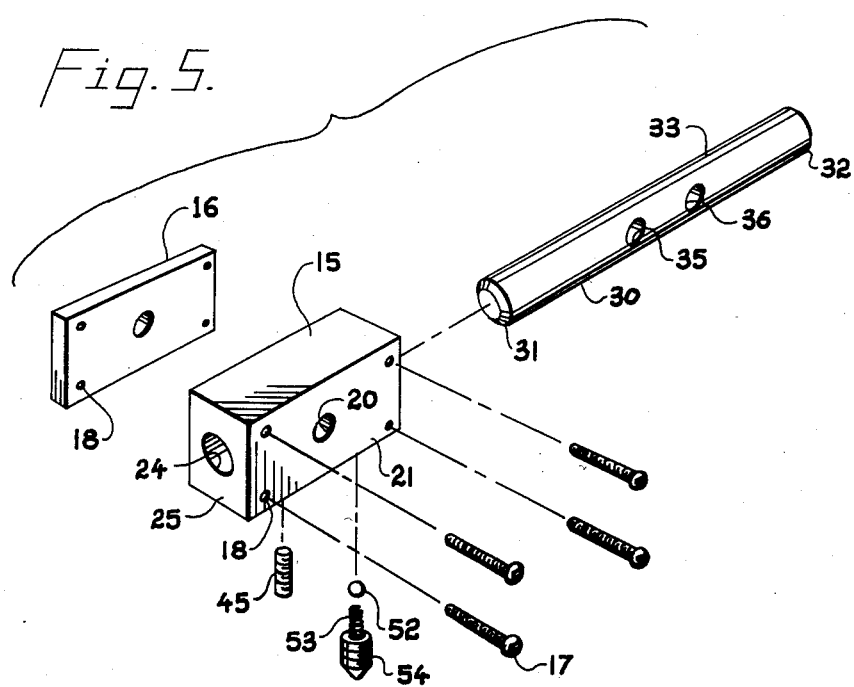
FIG. 5 is a disassembled perspective view of the switching mechanism.
Figure 6:
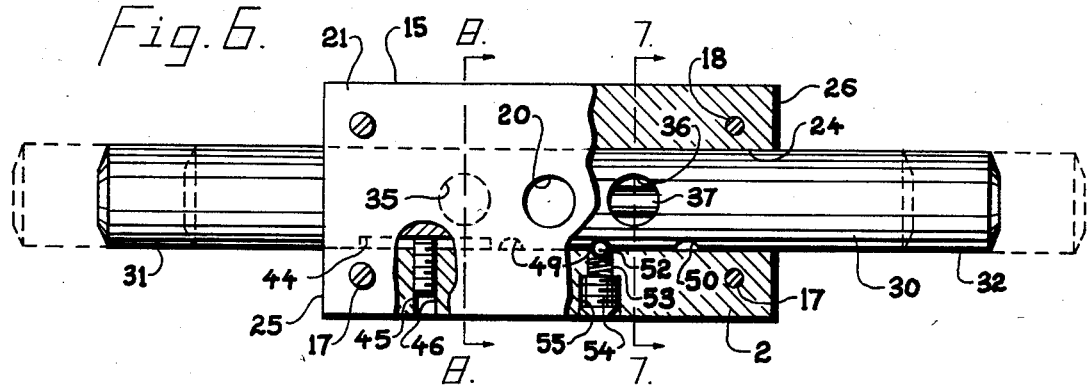
FIG. 6 is a fragmentary, elevational view of the switching mechanism.

A shiftable or slide member 30 is mounted within the bore 24 and is moved, such as by hand, from the left to right within the holder member 15. The slide member 30 has opposite ends 31 and 32 with chamfered edges. The slide member 30 has a mid-portion 33, FIG. 5, with orthagonally extending ports 35 and 36 spaced equidistantly from the midportion 33. One of the ports, the port 36, has a lens 37, FIGS. 6 and 7, mounted therein. The port 36 with its lens 37 is movable into the path of the laser beam to cause the beam to project in a plane. In the illustrated example, the lens 37 is a cylindrical optical quality glass rod mounted within the port 36 as by adhesives and oriented parallel to the longitudinal orientation of the slide member 30. In the other port 35 is a flat glass lens 38 such as of smoked glass or mirrored glass which merely attenuates the beam. As shown in FIG. 7, the cylindrical lens 37 change the energy or light rays from the configuration of the beam 40 to a plane of light 41, whereas when passing through the flat lens 38, the beam 40 remains a beam and is decreased slightly in intensity so as to be more readable when directed against a measuring rule or the like.

To properly position the slide member 30 within the holder member 15, various alignment means are employed. The slide member 30 includes a bottom groove 44 which, in association with a set screw 45 engaged in a screw hole 46 drilled in the bottom of the holder member 15, restrains the slide member 30 from rotating in the holder member 15.

To properly position each of the ports 35 and 36 on the slide member 30 with respect to the through openings 20, a detent arrangement is provided. In the illustrated example, the detent arrangement includes first, second and third hemispherical sockets 48, 49 and 50 which act as recesses for partially receiving a ball bearing 52. The ball bearing 52 is urged upwardly by a spring 53 and retained by a set screw 54 in a screw hole 55. The ball bearing 52 is urged upwardly by the spring 53 and catches in the first socket 48 to retain the laser beam in the beam configuration by registration of the port 35, with its flat lens 38, in the beam path. The second socket 49 provides a center position where neither the port 35 nor the port 36 are in registration with the through opening 20 and the laser beam is blocked. The third socket 50 registers the port 36, with its cylindrical lens 37, in the beam path so that the planar beam 41 is projected, FIG. 7.

In one example of use of the selective beam/plane projecting laser 1, the laser is used as part of an alignment system for vehicle frames and bodies. This system uses at least two elongate carrier bars 57 and 58 with measurement scale markings thereon beginning from a center position. At least one of the carrier bars, such as the carrier bar 58, has a target 60 mounted on its ends and the other of the carrier bars 57 has the selectible beam/plane projecting laser mounted on its end. In the illustrated example of FIG. 2, there are two carrier bars 58. The targets 60 and the selectible beam/plane projecting lasers 1 are mounted on the carrier bars 57 and 58 by slidable mounts 62 for translation toward and away from the center position of the carrier bars 57 and 58 and may include pivot means for sweeping perpendicular to the axis of the carrier bar 57 or 58, such as disclosed in the Eck Patent No. 4,330,945.

To sight the target 60 by the selectible beam/plane projecting laser without upward sweeping of the laser beam, the beam mode, FIG. 8, of the laser is changed to the planar projecting mode, FIG. 7, whereupon the coherent, collimated plane of light is projected on all surfaces within that plane, including the upper and lower positioned targets 60.

Thus, the selectible beam plane projecting laser provides an automatic vertical projecting capability without any sweeping or rotative movement of the laser to identify the position of points within a beam projected orthogonally to the carrier bars 57 or 58. Right angle alignment is then accomplished and coordinates are established on the x-y coordinate system defined by the combination of the carrier bars and the beam or plane projected by the laser 1.

Although the above description is in terms of vertical plane projection, the selectible beam/plane projecting laser may project planes of light in any direction orthagonal to its mounting bars 57 and 58. If the bars 57 and 58 are positioned vertically, then the plane projected would be horizontal.

It is to be understood that while certain forms of the present invention have been illustrated and described herein, it is not to be limited to the specific forms or arrangement of parts described and shown.

What is claimed and desired to be secured by Letters Patent is as follows:

1. A selectible beam/plane projecting laser comprising:
   (a) an elongate housing having front and rear ends with a front wall;
   (b) a laser beam projecting element mounted in said housing for directing a beam of laser generated energy out of the front end of said housing;
   (c) said front wall having an aperture through which said beam projects;
   (d) a switching means mounted to said housing generally at said front wall and including a holder member having a through opening coincident with said aperture and a shiftable member mounted in said holder and having a lens movable into the path of said beam to cause said beam to project in a plane;
   (e) said holder member includes a bore extending transversely to said through opening;
   (f) said shiftable member is a bar slidably mounted in said bore; and
   (g) said bar has longitudinally spaced ports selectively coincident with said through opening and said aperture for passage of said beam therethrough.

2. The laser set forth in claim 1 wherein:
(a) one of said ports has said lens mounted therein.

3. The laser set forth in claim 1 wherein:
(a) said rod has a longitudinal axis oriented parallel to the longitudinal axis of said bar.

4. A selectible beam/plane projecting laser comprising:
(a) an elongate housing having front and rear ends with a front wall having an aperture therethrough located at said front end;
(b) a laser beam projecting element mounted in said housing for directing a beam of laser generated energy out of the front end of said housing and through said aperture;
(c) a holder block mounted to said front wall and having a through opening aligned with said aperture and a bore extending transversely to and crossing said opening;
(d) a bar slidably mounted in said bore and having longitudinally spaced ports selectively aligned with said opening, one of said ports having a rod lens mounted therein for changing said beam into a plane; and
(e) detents in said bar and a spring biased catch in said holder block coordinating to stop sliding of said bar in said bore at a beam projecting position and a plane projecting position.

5. A laser alignment system for vehicle frames and bodies comprising:
(a) at least two elongate carrier bars and means for mounting said carrier bars to a vehicle and extending transversely thereto;
(b) said carrier bars having measurement scales thereon beginning from a center position;
(c) at least one of said carrier bars having a target mounted thereto, said target being slidably mounted on said carrier bar for translation toward and away from said center position;
(d) another of said carrier bars having a laser projector mounted thereto, said laser projector being slidably mounted on said carrier bar for translation toward and away from said center position;
(e) said laser projector including;
 (i) an elongate housing with front and rear ends and a front end wall;
 (ii) a laser beam projecting element mounted in said housing for directing a beam of laser generated energy out of the front end of said housing;
 (iii) said front wall having an aperture through which said beam projects;
 (iv) a switching means mounted to said housing generally at said front wall and including a holder member with a through opening aligned with said aperture and a shiftable member mounted in said holder and having a rod lens movable into the path of said beam to cause said beam to project in a plane.

6. A selectible beam/plane projecting laser comprising:
(a) an elongate housing having front and rear ends with a front wall;
(b) a laser beam projecting element mounted in said housing for directing a beam of laser generated energy out of the front end of said housing;
(c) said front wall having an aperture through which said beam projects;
(d) a switching means mounted to said housing generally at said front wall and including a holder member having a through opening coincident with said aperture and a shiftable member mounted in said holder and having a lens movable into the path of said beam to cause said beam to project in a plane; and
(e) said lens is a rod.

7. A laser alignment system for vehicle frames and bodies comprising:
(a) at least two elongate carrier bars and means for mounting said carrier bars to a vehicle and extending transversely thereto;
(b) said carrier bars having measurement scales thereon beginning from a center position;
(c) at least one of said carrier bars having a target mounted thereto, said target being slidably mounted on said carrier bar for translation toward and away from said center position;
(d) another of said carrier bars having a laser projector mounted thereto, said laser projector being slidably mounted on said carrier bar for translation toward and away from said center position;
(e) said laser projector including;
 (i) an elongate housing with front and rear ends and a front end wall;
 (ii) a laser beam projecting element mounted in said housing for directing a beam of laser generated energy out of the front end of said housing;
 (iii) said front wall having an aperture through which said beam projects;
 (iv) a switching means mounted to said housing generally at said front wall and including a holder member with a through opening aligned with said aperture and a shiftable member mounted in said holder and having a lens movable into the path of said beam to cause said beam to project in a plane;
 (v) said holder member includes a bore extending transversely to said through opening;
 (vi) said shiftable member is a bar slidably mounted in said bore;
 (vii) said bar has longitudinally spaced ports selectively alignable with said aperture for passage of said beam therethrough; and
 (viii) one of said ports has a rod lens mounted therein to change said beam to a plane of laser generated energy.

* * * * *